United States Patent [19]

Vensko et al.

[11] Patent Number: 5,073,939

[45] Date of Patent: Dec. 17, 1991

[54] DYNAMIC TIME WARPING (DTW) APPARATUS FOR USE IN SPEECH RECOGNITION SYSTEMS

[75] Inventors: George Vensko, Ramona; Khuong B. Lieu; Steven A. Meloche; John C. Potter, all of San Diego, all of Calif. of Calif.

[73] Assignee: ITT Corporation, New York, N.Y.

[21] Appl. No.: 363,227

[22] Filed: Jun. 8, 1989

[51] Int. Cl.[5] .............................................. G10L 7/08
[52] U.S. Cl. ....................................... 381/43; 381/41
[58] Field of Search ..................................... 381/41–46, 381/51; 364/513.5, 200; 365/230.03, 230.09

[56] References Cited

U.S. PATENT DOCUMENTS

| | | | |
|---|---|---|---|
| 4,282,403 | 8/1981 | Sakoe | 381/43 |
| 4,355,302 | 10/1982 | Aidefeld et al. | 382/34 |
| 4,519,094 | 5/1985 | Brown et al. | 381/43 |
| 4,720,864 | 1/1988 | Tajima et al. | 381/43 |
| 4,941,178 | 7/1990 | Chuang | 381/41 |
| 4,956,865 | 9/1990 | Lennig et al. | 381/43 |

*Primary Examiner*—Dale M. Shaw
*Assistant Examiner*—Michelle Doerrler

*Attorney, Agent, or Firm*—Arthur L. Plevy; Patrick M. Hogan; Peter A. Abruzzese

[57] ABSTRACT

There is disclosed a dynamic time warping (DTW) apparatus for use in a speech recognition system which also performs wordspotting or speaker verification based on speech recognition techniques. The DTW apparatus has the capability of processing given different groups of coefficients and doing such processing to arrive at Euclidian and dynamic distances independent of the number of coefficients in the group. Essentially the DTW can process 8, 16 or 24 coefficients and provide distance measurements based on such coefficients which will enable the same stored template to be utilized in comparing speech utterances as defined by the coefficients with stored template data. The configuration of the DTW is such that rapid processing can occur whereby the unit can process a large number of frames in a relatively short period, as the number of frames processed is a function of the number of coefficients in the processed group and can process different numbered coefficients in a rapid and reliable manner. The DTW also minimizes the template memory requirements. Only one copy of each template is stored in template memory.

18 Claims, 14 Drawing Sheets

FIG. 3

| 15 | 14 | 13 | 12 | 11 | 10 | 09 | 08 | 07 | 06 | 05 | 04 | 03 | 02 | 01 | 00 |
|----|----|----|----|----|----|----|----|----|----|----|----|----|----|----|----|
|    |    |    |    |    |    | M  | T  | F  | F  | N  | N  | D  | R  | R  | R  |

RRR=
0 — INITIALIZATION
1 — 1ST GROUP OF 4 UNKNOWNS
2 — 2ND GROUP OF 4 UNKNOWNS
3 — 3RD GROUP OF 4 UNKNOWNS
4 — DISTANCE LIMIT REGISTER
5 — PRUNING REGISTER
6 — RESCALE REGISTER
7 — TOP MIN TEMPLATE INDEX COUNTER

NN=
0 — N/A
1 — 8 COEFF.
2 — 16 COEFF.
3 — 24 COEFF.

D=
0 — REGULAR MOVE
1 — DIAGONAL MOVE ONLY

FF=
0 — SHIFT RIGHT 0 (UPPER 16 BITS ARE RESERVED)
1 — SHIFT RIGHT 2
2 — SHIFT RIGHT 4
3 — SHIFT RIGHT 6

T=
0 — NORMAL MODE
1 — TEST MODE (HW ONLY)

M=
0 — MAX. MEMORY SIZE (USING 256K x 4 DRAM)
1 — MIN. MEMORY SIZE (USING 64K x 4 DRAM)

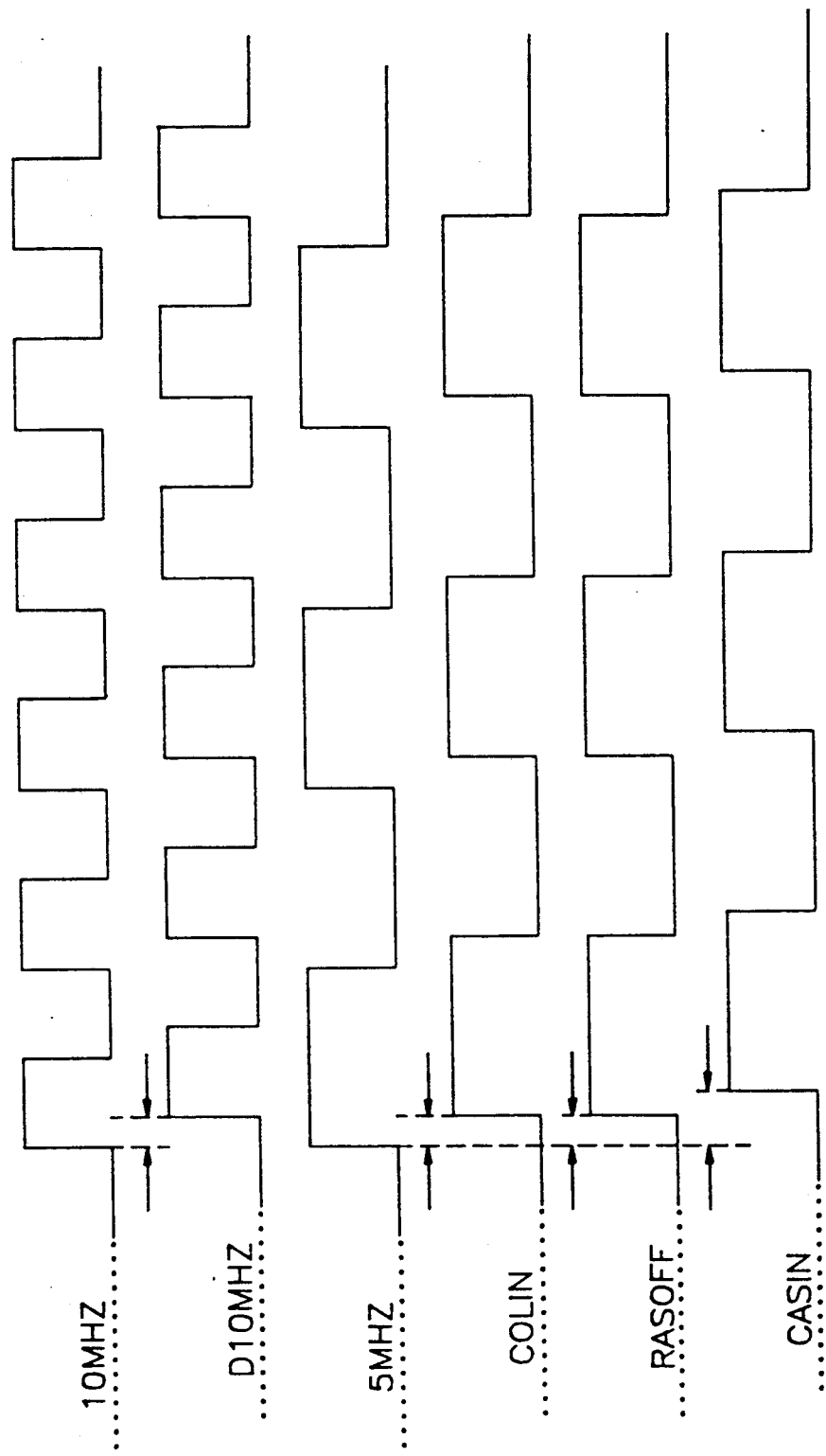

DYNAMIC TIME WARPING (DTW) APPARATUS FOR USE IN SPEECH RECOGNITION SYSTEMS

BACKGROUND OF THE INVENTION

This invention relates to speech recognition and speaker verification systems in general and more particularly to a dynamic time warping (DTW) apparatus useful in speech recognition and speaker verification systems.

As one can understand, speech recognition and speaker verification systems have been proposed in the prior art which operate to recognize isolated or connected utterances by comparing unknown audio signals suitably processed with one or more previously prepared representations of known signals. In this respect, the known or stored signals for keyword spotting are sometimes referred to as key words and are provided by means of templates which are stored and then compared with the incoming speech in order to determine a match.

Thus, one can understand, there are numerous references which exist in the prior art which relate to such systems. Different systems operate on different principles and essentially such systems attempt to recognize an unknown audio signal by comparing the signal with various stored means such as templates and so on, as is well known in the art.

One type of system is referred to as word spotting where in word spotting one responds to incoming speech to detect words of interest. The number of words of interest are called key words and is usually a small number. The goal is to determine the instant in time when any key words are spoken and which key word it is. Hence there are many systems which operate in regard to the recognition of key words.

Known methods of speech recognition word spotting and speaker verification use a technique called dynamic time warping (DTW). DTW allows computer representation of two different utterances of the word to be brought into time alignment with one another. This is done by compressing or expanding or both compressing and expanding in different places the time axis of one representation. The purpose of DTW is to compensate for differences between two utterances in pronunciation or speaking rate. In practice one of the two representations is an example of the word, called a template. DTW is used to measure the similarity between the template and segments of input speech which might be utterances of the same words.

The computer representation of utterances referred to above is as follows. The signal from a microphone is analyzed within contiguous time intervals called frames. The result of the analysis is a vector each frame that, specifies the power spectrum as a function of frequency of that frame. A sequence of such vectors over the period of an utterance is the computer representation of the utterance. A sequence of such vectors over the period of a key word could be used as the template for the key word.

Essentially, in such a system, the distance between, for example, the unknown speech and a template is referred to as the Euclidian distance and this distance is calculated by such systems. A DTW system operates to find the path that minimizes the sum of the distances in regard to the templates through which the speech signal is processed. For each input frame a DTW computation can proceed from the first template frame to the last.

DTW was originally used for the recognition of isolated words with known end points and this has been discussed in many references. See, for example, an article entitled "An Efficient Elastic Template Method for Detecting Given Key Words in Running Speech" by J. S. Bridle, British Acoustical Society Meeting, pp. 1-4, Apr. 1973. See, also, an article entitled "An Algorithm for Connected Word Recognition" published in the Proceedings. International Conference Acoustic Speech and Signal Processing, Paris, France 1892 by J. S. Bridle, N. D. Brown and R. N. Chamberlain. Various other prior art references discuss such systems employing dynamic time warping.

An extremely important part of any system is the circuitry which operates to provide the DTW functions. Such circuitry of course must be relatively economical to produce, simple to fabricate and operate efficiently and reliably.

SUMMARY OF THE INVENTION

A speech recognition system for recognizing unknown uttered speech by comparing unknown speech with stored template data and providing a best match to determine the word or phase uttered, the system including an analog to digital converter for converting unknown speech into digital formats and a digital signal processor for converting said digital formats into a plurality of bandpass filter coefficients or linear predictive coding (LPC) coefficients for processing said coefficients by dynamic time warping to derive from said coefficients Euclidian distances which are processed by template comparison to provide a best match between an utterance and template indicative of a spoken word, in combination therewith, means for providing bandpass filter coefficients in at least two different groups with a first group of a given number of coefficients and a second group of at least twice the number of coefficients, dynamic time warping (DTW) means operative to process either a first or second group of coefficients as selected to provide a given bit Euclidian distance independent of the number of coefficients in said group and including, means responsive to said distance for providing a dynamic distance measurement based on said Euclidian distance as compared to said templates to determine the identity of an utterance and independent of the number of coefficients processed.

BRIEF DESCRIPTION OF THE FIGURES

FIG. 3 is a schematic diagram showing the layout of a control register and a legend associated with the register defining the various bits employed;

FIG. 4 is a timing diagram showing a delayed timing setup indicative of system operation;

DETAILED DESCRIPTION OF THE FIGURES

Figure 1:
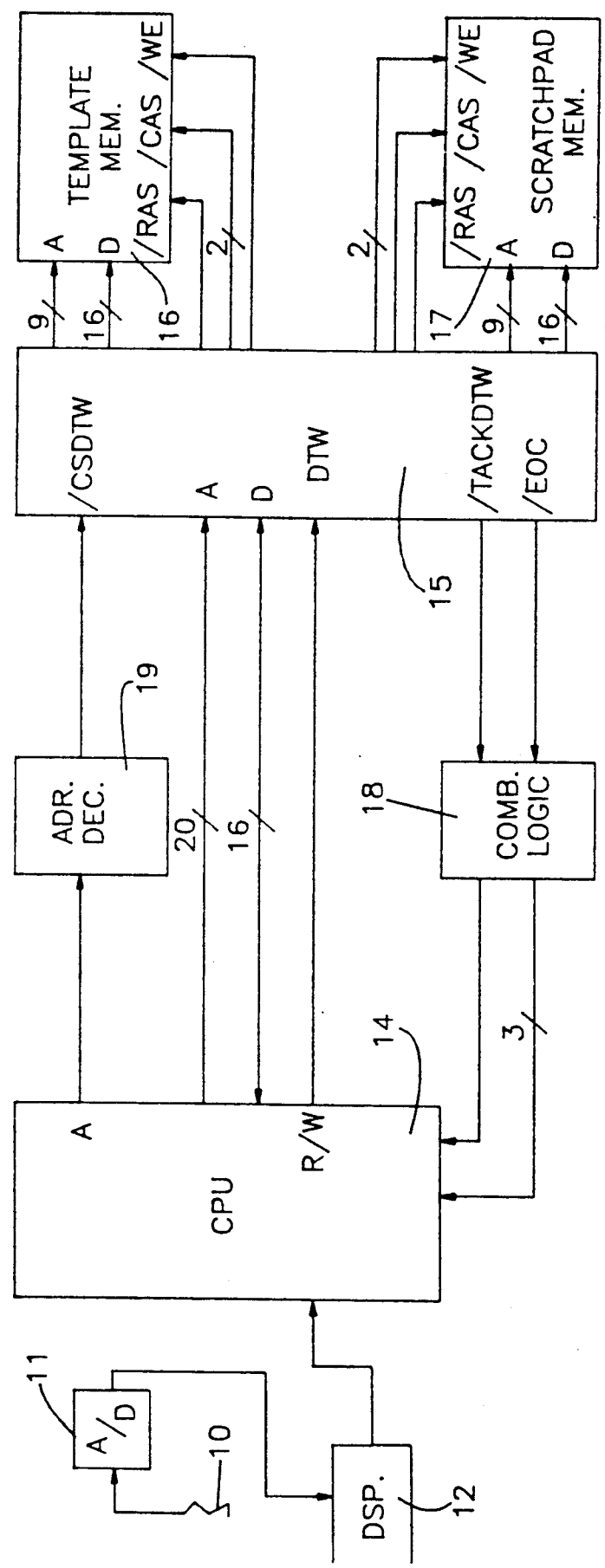
FIG. 1 is a block diagram showing a typical voice recognition system employing a dynamic time warping (DTW) apparatus in accordance with this invention.

Referring to FIG. 1 there is shown a simple block diagram illustrating the use of a DTW module in regard to a typical speech recognition system configuration. The system in FIG. 1, for example, may be a voice recognizer system (VRS) employing continuous speech recognition operation and may include, for example, a voice synthesizer with high real time throughput capability and high recognition accuracy. Any speech processing system employing the DTW processing techniques may be employed with the present system, as will be explained. As seen, the speech recognition system includes, for example, a microphone 10 which interfaces with an analog to digital converter 11. The analog to digital converter 11 converts the incoming audio speech into a digital format which digital format is processed by means of a digital signal processor 12 (DSP). The output of the digital signal processor is applied to an input of a Central Processing Unit (CPU) or microprocessor 14. The CPU is an integral part of most modern systems and essentially interfaces with the DTW module 15 by means of various input/output lines, as will be discussed. The DTW module 15 is associated with a template memory 16 and a scratch pad memory 17, the functions of which will le explained.

The DSP 12 is also a microprocessor and for example performs bandpass filtering or linear predictive coding of the digitized audio signals developed by the analog to digital converter 11 and will output bandpass filter coefficients or LPC coefficients to the CPU 14. The CPU 14 in such systems performs overall control of the operation of the VRS and portions of the digital signal processing and recognition operations.

As will be explained, a major element in a voice recognition system which provides its throughput capability is the DTW circuit 15. As will be further explained, and as seen in FIG. 1, the circuit includes a template memory 16 and a scratch memory 17, which are controlled in operation by the DTW 15. The DTW module 15 performs a template match and a dynamic time warping functions. The template memory 16 contains a recognition vocabulary and the scratch pad memory is a working memory used to calculate the best match of vocabulary templates to incoming audio.

The DTW chip, as will be explained, has a throughput capability of about 660 seconds of speech templates in real time which is equivalent to about 1100 templates. The time taken by the CPU to set up the chip and interpret results produces an overhead of about 25% of real time. Therefore the system throughput, due to these constructions of the DTW 15 is about 800 templates in real time. The DTW chip 15 is designed to operate as a coprocessor in conjunction with CPU 14. The DTW chip 15 is connected to the CPU directly. Also connected to the CPU, for example, are typical input/output circuits which are connected to other real time input/output channels of the CPU and which are necessary to interface with various other modules. These are well known.

The DTW 15 resides in circuit between the CPU 14 and the dynamic RAM which consists of the template memory 16 and scratch pad memory 17. It is in these modules that the DTW parameters and templates are stored. As will be explained, every CPU access to the template memory 16 or the scratch pad memory 17, will be through the DTW 15 and this is completely transparent to the CPU 14. In this manner the circuit operates at extreme efficiency based on the fact that the CPU 14 treats the DTW 15 as a peripheral.

As seen in FIG. 1, the DTW 15 has two main blocks of memory connected to it. Its maximum capacity is $512K \times 16$ of template memory 16 and $256K \times 24$ of scratch pad memory 17. Both blocks of memory are RAM and have their own address and data lines as well as RAS (row address strobe), CAS (column address strobe) and WE (write enable lines).

The CPU interface has a 16 bit data bus (D) and a 20 bit address bus (A). The CPU also supplies a chip select (CSDTW), a read/write control line (R/W), a hardware reset line (RS) and a 10 MHZ clock. The DTW 15 provides a transfer acknowledge signal (TACK) and a signal ($\overline{EOC}$) used to generate an interrupt to the CPU for an asynchronous interface. These signals are applied to the CPU through a combinatorial logic module 18 which operates to convert the DTW logic signals to interface with the CPU 14. As also seen in FIG. 1, the CPU can access the DTW 15 by means of address decoder 19 at an address input which is further designated by CSDTW. In any event, as one will understand, the CPU 15 is a conventional microprocessor, as for example the 68000 microprocessor manufactured by Motorola and designated as the Motorola MC 68000. This microprocessor, as will be understood, operates at 10 MHZ.

Figure 2A:
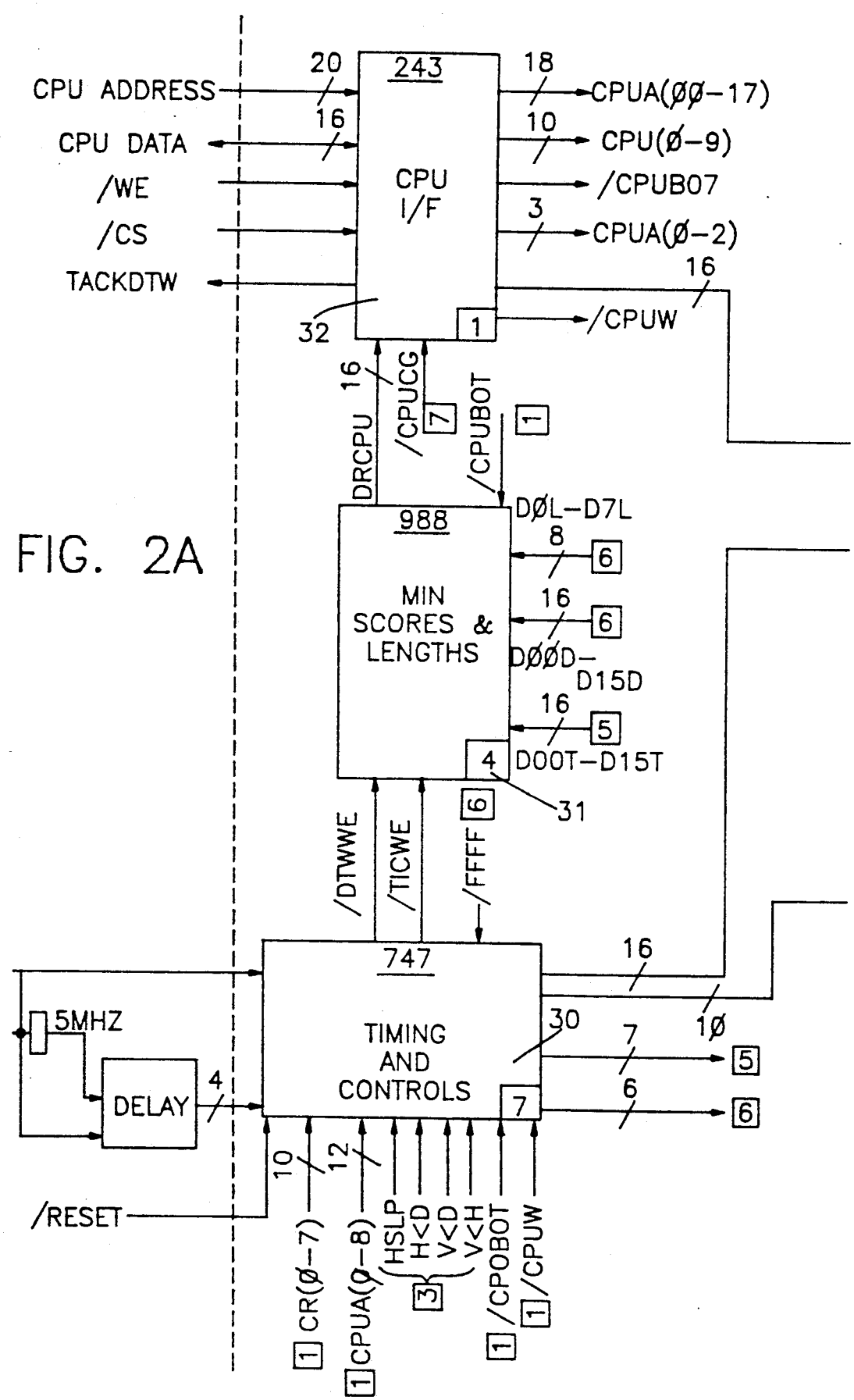
FIG. 2 is a detailed block diagram of a DTW apparatus according to this invention.
Figure 2B:
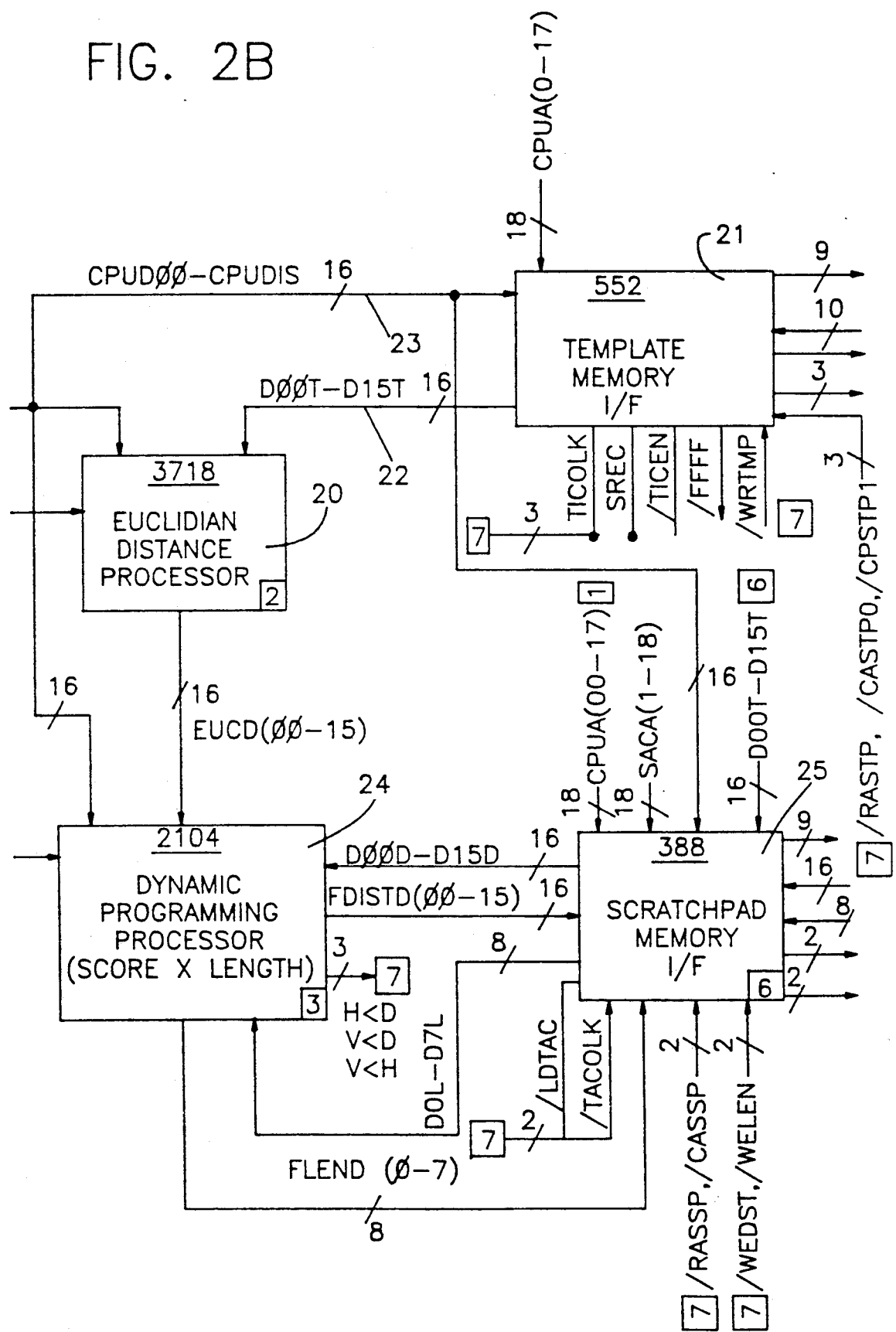

Referring to FIG. 2 there is shown a detailed block diagram of the DTW module 15 of FIG. 1. As one will understand, the heart of the DTW module 15 is a Euclidian distance processor circuit 20. The Euclidian distance processor circuit 20 is coupled to a template memory interface 21 via buses 22 and 23. There is also shown coupled to the Euclidian distance processor 20 a dynamic programming processor 24. The dynamic programming processor 24 is coupled both to the Euclidian distance processor 24 and to the template memory interface 21 and the scratch pad memory interface 25.

The entire timing operation of the DTW is implemented by means of a timing and control module 30. The timing and control module 30, as understood, will in fact control the operations of the DTW in regard to providing system clocks and various other signals, as will be explained. There is a module 31 designated as MIN scores and length module. Essentially, as will be explained, the module 31 is a processor which can compute scores and lengths and is coupled to both the template memory interface 21, the scratch pad memory interface 25 and operates under control of the timing and control module. The function of the module 31, as will be further explained, is to provide scores to determine whether or not a match of an incoming audio signal is made by means of a template and hence necessary to recognize a particular spoken word.

The entire system interfaces with the CPU via a CPU interface module 32. The various leads emanating from module 32 are shown in the diagram and are as follows. The CPU interface 32, which emanates from the DTW module, as indicated, is designed to accommodate the Motorola 68000 microprocessor. There is shown the following signals.

| | |
|---|---|
| A(0-19)CPU | 20 CPU word address lines to address the memory modules & DTW internal registers. |
| D(0-15)CPU | 16 bit bidirectional data path |
| CSDTW | DTW chip select signal, to enable a memory/register access |
| R/W | CPU read/write signal |
| TACK | This is the transfer acknowledge (open collector) signal that will determine the number of wait states in CPU cycles for a memory/register access. |
| RS | hardware reset |
| EOC | Interrupt signal to indicate the completion of a DTW task (End of column or End of node) |

A19CPU is used to select between the Template and Scratch Pad memory blocks.

A18CPU is used to select two different banks of template memory for 256K×4 DRAM and A16CPU for 64K×4 DRAM.

A0CPU is used to select between distance and length in the scratch pad memory. The DTW can access all 24 bits in parallel, but the CPU can only access 16 bits at a time.

Memory access from the CPU will be time shared with the DTW chip and that sharing is controlled by the arbitration logic which allows the CPU to access memory only in proper clock phases.

The CPU 14 can access the template or scratch pad memories as 21 and 25, as well as several registers within the DTW module. The control register is mapped into the bottom of the scratch pad memory. Other registers are mapped into scratch pad memory or accessed through the Control Register and are indicated in the following table.

read, the CPU needs to do a word write followed by a word read with the next odd address.

The unknown registers are divided into 3 sets with eight 8-bit coefficients in each set. Depending upon the configuration of 8, 16, or 24 coeff. (20 coeff. case is the same as 24 coeff. with zeroes fill in), each set will be separately selected. The unknown register data are supplied by the CPU which processes the band pass filter coefficients from the front end processor or CPU 14.

The scratch pad memory address counter (SAC) is an 18 bit counter which is loaded by the CPU and incremented by the DTW chip for every write into scratch pad memory (Scratchpad Memory).

The Node Bottom Score REGister (NBSREG) is loaded at the beginning of a node. Its value is used as the diagonal score and is selected as the first score immediately after the Template Address Counter (TAC) was loaded (MIN Scores).

The TAC Temp Memory Interface is a 16 bit counter which is loaded only by the DTW chip from template memory using the TIC. The DTW chip uses the TAC to fetch the operational template data.

The Template Index Counter (TIC) timing and control is a 16 bit counter which is set to 0 during reset. It is loaded by the CPU to start a node process and its content is the index into a table in the template memory the contents of which point to the actual template locations within template memory and are used to load the TAC. The DTW increments the TIC by 1 when an End-of-template is encountered.

The term MIN indicates that the register is located in the MIN SCORES & LENGTH MODULE 31 of FIG. 2. The term DPP indicates that the register is located in the Dynamic Programming Processor (DPP) 24 of FIG. 2.

The Maximum path Length (MAXLEN) MIN register has 8 bit data which is the largest path length taken by the DTW chip in a node.

The Minimum Top Score (TPMSCOR) MIN register is the smallest top score in a node. The top score is the

| Regs | R/W | Description | CTRL/SP | Adr Index |
|---|---|---|---|---|
| CONTROL | W | Control reg | SP | 0 |
| UNKREG (0-11) | W | 12 Unknown regs | SP/CTRL | 2 |
| SAC | W | Scatchpad Address Counter | SP | 4,6 |
| NBSREG | W | Node bottom score register | SP | 8 |
| TIC | W | Template Index Counter | SP | A |
| TPMSCOR | R | Top Minimum Score | SP | 4 |
| TMLEND | R | Top Minimum Length | SP | 6 |
| TMINDEX | R | Top Min Temp. index | SP | 6 |
| GMLEND | R | Global Minimum Length | SP | 8 |
| MAXLEN | R | Maximum path length | SP | 8 |
| GBMSCOR | R | Global Minimum Score | SP | A |
| DISLIM | W | Distance limit reg | CTRL | |
| PRUREG | W | Pruning reg | CTRL | |
| RSCLREG | W | Distance rescale reg | CTRL | |
| TMTIC | W | Top min templ. index ctr. | CTRL | |

During power up reset, the CPU loads the control register with an /INIT command (CR0-CR2=0) to allow it to configure the DTW chip in an appropriate mode. The 4 bits CR6-CR9 (scaling factor, test mode, memory size) could be changed only with the /INIT command. To set up the control-mapping registers, the CPU is required to write the control register with the data bits which select the registers that it wants to read/write on the next access cycle. This could be done by a long word write from the CPU with the even address reserved for the control register. However for a score generated before an End-of-Template.

The Top Min Template INDEX (TMINDEX) MIN. register is an 8-bit register which has the template frame number that points to the location where a top min score is found.

The global min length MIN register has the path length value associated with the global min score.

The maximum length data MIN register is the largest path length value in a node.

The global minimum score (GBMSCOR) MIN register has the smallest score in the entire node.

The DIStance LIMit (DISLIM) Euclidian distance register is loaded by CPU for one or more nodes. Its content is compared against the scaled distance and the smaller value is selected as the new Euclidian distance.

The PRUning REGister (PRUREG) DPP is used for comparison against the selected score in the dynamic programming processor. If the score is larger, than it is forced to (HEXCODE) and the rescaling is bypassed.

The distance ReSCaLe REGister (RSCLREG) DPP is for rescaling the score after pruning was done. Its content is subtracted from the selected score and the new score is written by the DTW chip into scratch pad memory.

The Top Min Template Index Counter (TMTIC) timing control is an 8 bit counter that counts the template frames in a node. When a new top min score is found. the content of this counter is loaded into Top Min Template INDEX register (TMINDEX).

The format of the control register is shown in FIG. 3. Essentially the control register is a 10 bit register where the bits are indicated in tabular form in the box shown in FIG. 3. The first three bits, designated as RRR enable control signals to be sent to the CPU in order to enable, for example. the CPU to write into first, second or third group of registers in order to implement coefficient processing for an automatic speech recognition unit. The control register also allows access to the distance limit register, a pruning register, a rescale register and the top minimum template index counter.

The other settings of other bits, such as NN determine whether it will be processing of 8 filter coefficients, 16 filter coefficients or 24 filter coefficients. The D position provides control signals indicative of memory scans, as for example, to scan the template memory in a regular mode or a diagonal mode. Other controls indicate various shift modes whereby contents can be shifted to the right to perform simple multiplication or division. as well as a mode determining maximum and minimum memory sizes regarding the system operation.

As indicated above, the DTW contains a unique array of registers utilized for control purposes and which will operate in conjunction with a microprocessor to produce extremely rapid and reliable processing time in order to implement the DTW type of word processing in such systems.

As will be further explained. the control register, as indicated, can access unknown registers which are written into by the CPU. These registers are divided into three sets with 8 bit coefficients in each set. Depending upon a configuration of 8, 16, or 24 coefficients, each set will be separately selected by the CPU. Hence, processing can be performed by the DTW utilizing 8 bit coefficients, 16 bit or 24 bit coefficients. These coefficients refer to bandpass filter coefficients or LPC coefficients as will be explained. In any event, the unknown register data are supplied by the CPU which processes the bandpass filter coefficients available from the DSP 12, as shown in FIG. 1.

The scratch pad memory interface module 25 includes a scratch pad memory address counter (SAC) which is an 18 bit counter, the contents of which is loaded by the CPU and incremented by the DTW module for every write into the scratch pad memory. Scratch pad memory is not shown in FIG. 2 but essentially is coupled to the scratch pad memory interface and is a conventional available RAM.

There is a node bottom score register (NBSREG) which is loaded at the beginning of a node. Its value is used as the diagonal score and is selected as the first score immediately after the template address counter (TAC) is loaded. This register appears in the dynamic programming processor module 24. The TAC, or template address counter, is a 16 bit counter which is located in the template memory interface 21 and is loaded by the DTW module from template memory using the TIC. The DTW chip uses the TAC to fetch the optional template data. The template index counter (TIC) is located in the timing and control module 30. It is loaded by the CPU to start a node process and its contents is used to fetch the TAC. The DTW increments the template index counter by 1 when an end-of-template (HEX) is encountered.

Essentially, as will be further explained, every speech recognition system operates in order to solve predetermined algorithms which essentially determine when a template matches an unknown speech sample. The speech samples are digitally converted. The whole function of a DTW module, as indicated above, is to perform dynamic time warping. In this manner the incoming speech is processed and controlled according to the nature of the stored template. The DTW module, of course, is a coprocessor which operates in conjunction with the CPU to perform the complicated processing required by a speech recognition system. In any event, in order to accommodate such processing one needs the plurality of registers, as distributed, as described herein, to operate in a rapid and reliable manner.

A maximum path register (MAXLEN) is located also in the min scores and lengths module 31 and has 8 bit data which determines the largest path length taken by the DTW chip in regard to the solution of a node.

There is a minimum top score (TPMSCOR) register also located in the min score and length module 31 which stores the smallest top score in a node. The top score is the score generated before an end-of-template signal. A top minimum template index (TMINDEX) is an 8 bit register which has the template frame number that points to the location where a top min score is found. This is also located in module 31.

There is a global min length register located in module 31 where the path length value associated with the global minimum score is stored. The module 31 also contains a maximum length data register which determines the largest path length value in a node. The global minimum score register, which accumulates minimum scores, has the smallest score in the entire node and is also present in module 31.

In order to fully operate such a system, and as will be fully explained, there is a distance limit register (DISLIM) which is loaded by the CPU for one or more nodes. This is located in the Euclidian distance processor 20. Its contents is compared against the scale distance and a smaller value is selected as a new Euclidian distance.

A pruning register (PRUREG), as indicated above, is used to compare against a selected score from the dynamic programming processor 24. If the score is larger than it is forced to a hex code and the rescaling is bypassed.

A distance rescale register (RSCLREG) is for rescaling the score after pruning was done. Its content is subtracted from the selected score and the new score is written by the DTW module into the scratch pad memory.

A top minimum template index counter (TMTIC) is located in timing control module 30 and is an 8 bit counter that counts the template frames in a node. When a new top minimum score is found the content of this counter is loaded into the top minimum template index register (TMINDEX)

Referring again to FIG. 1, the memory module essentially consists of template (TP) and scratch pad (SP) memory blocks. These are commercially available RAMS and constitute the template memory 16 and the scratch, pad memory 17 as interfaced by the DTW module 15 via the respective interface modules 20 and 25, as shown in FIG. 2. Each memory can be implemented for maximum configuration using 256K $\times$ 4 DRAM chips with a maximum row access time of 100 ns and a maximum cycle time of 200 ns. Otherwise, 64K $\times$ 4 DRAM with the same timing constraints could be used for smaller configurations. In this manner the control register, as formatted in FIG. 3, has the end bits indicating to the CPU which of the memory sizes is being employed.

As indicated above, the entire interface, as shown in FIG. 2, has been designed in such a way that any access from the CPU has to go through the DTW chip and will be controlled by the memory arbitration logic. There are different clock phases reserved for the CPU access when the DTW module is in an idle or processing mode. To handle a large number of template coefficients with minimum reduction in throughput, the DTW chip accesses template memory using a fast page mode in which a group of four locations are read for one RAS cycle of 600 ns instead of four cycles of 200ns each as in the normal mode. However, the CPU wait states are increased when the DTW is in templates processing mode.

There are four delayed input signals which are employed and are generated in the timing and control module 30 of FIG. 2. These signals assist in controlling the DRAM access time and are given below.

| | |
|---|---|
| COLIN: | delayed from the 5 MHz clock to allow the switching from row to column address. |
| CASIN: | delayed from the 5 MHz clock to generate the $\overline{CAS}$ signals |
| D10 MHZ: | delayed from the 10 MHz clock for paging mode timing |
| RASOFF: | delayed from the 5 MHz clock to trigger the $\uparrow$ transition on $\overline{RAS}$. This signal is necessary to accommodate a larger minimum RAS pulse width for some DRAM chips |

As indicated above, the maximum configuration of template memory is 512K $\times$ 16 and divided into two different sections which are dynamically allocated. The first section is used to store the pointers pointing to the area where the operational template coefficients are kept. Those addresses belong to the same node (column) are grouped together and terminated by end of column characters (HEX). The second section is the storage area for the coefficients with the end of template character (HEX) to separate them into 8, 16, or 24 groups. In the case of 20 coefficients templates, the operation is the same as with 24 coefficients but there will be zeroes fill in for the last 4 due to the fast page mode access.

The DTW employs the 16 bits from the template index counter (TIC) to address the points in the first memory section. This first section must be allocated in the lower 64K of the address range. The TIC is loaded by the CPU every time a new column is started and is incremented by DTW chip when an end-of-template is encountered. Access to the operational template coefficient storage area by the DTW is performed from the template address counter (TAC) that is loaded by the DTW and is incremented by 1 after every template fetched. When an end of template is detected, the DTW reloads this register with the data fetched in by the TIC. This data is actually only 16 bits wide therefore the three zeroes are appended to be the least significant bits of the TIC. This method is superior to prior art where multiple copies of templates are kept in template memory requiring a larger template memory to be implemented.

The CPU has 18 leads to access the memory block. The CPU A lines are multiplexed with the TAC output to generate 18 bit row/column addresses which are then multiplexed again into 9 bit row and 9 bit column addresses. The connection in the last stage of multiplexing is for fast page mode access in DRAM.

The data path, with the scratch pad memory block, consists of 16 bit distance and 8 bit length. It has 256K words of 24 bits and is accessed by four control signals. Every read/write from the DTW is for both length and distance. The CPU can only have either length or distance for each access. The DTW uses the 18 bit scratch pad address counter (SAC) to make an access to the scratch pad memory. These 18 lines are multiplexed with the CPU A (0–17) to generate row/column addresses which are then separated into 9 bit row and 9 bit column. With separate scratch pad address register, the scores of templates belonging to more than one node will not have to be duplicated, being dynamically allocated by software. There are also reserve refresh cycles using CAS before RAS scheme, as in the template memory.

The system, because of the above-described architecture, can process 8, 16, 20 or 24 coefficients as fed to the CPU by the DSP 12 of FIG. 1. As indicated above, the number of frames that can be processed in the page mode with a 20 millisecond frame time are 33,333 for 8 coefficients, 16,666 for 16 coefficients, and 11,111 for 20 or 24 coefficients. As one can ascertain, this is a doubling of the number of frames processed in this page mode condition, as compared to a normal mode processing.

Addresses for the DTW's memory go to two sets of multiplexers, the first of which selects between the CPU and the DTW addresses. The second set of multiplexers selects between the row and column addresses for the DRAM. These multiplexers are contained in the CPU I/F interface. The 16 bit latch is used to hold data that the CPU is reading so that the DTW processing will not be interrupted by slow microprocessor accesses. This data is held for as long as the CPU needs it.

There are different sources that the CPU can read from: the template memory 16, scratch pad memory (distance and length) 17 and internal registers. This scratch pad memory 17 can be written to by the CPU or the DTW while only the CPU writes to the template memory. Internal registers which are read by the CPU consist of global min score (GMSCORE), global min length (GMLEND), max path length (MAXLEND), top min score (TMSCORE), top min length (TMLEND) and top min index (TMINDEX). There are two address counters for template and scratch pad memories. The scratch pad address counter (SAC) is an 18 bit counter which is loaded by the CPU before starting of a new node calculation. The DTW chip uses it to fetch in the distance value (horizontal cell) and increments it by 1 for every scratch pad write of a new score. The template address counter (TAC) is a 19 bit counter which is loaded by the DTW module using the address and the template index counter (TIC) after the TIC was loaded by the CPU for the first frame or when an end of template is detected for every new frame thereafter.

The global min circuit works as follows. When the CPU writes into the TIC, which is the template index counter, the DTW begins processing. This also sets the global min score register to an initial start value (HEX) then until an end of column is reached each score computed by the DTW is compared to the value in the global min score register. If this score is less than the register content, this register is updated with a new value. When the CPU reads the global min score register, the value that it gets is the smallest distance value in the present node.

In order to provide a top min score, a top min score register is initialized to an initial hex value at the beginning of a new node. When an end of template is encountered the last score is compared to the value in the top min score register. If this value is less than the register content the top min score register will be updated with the new value.

The top min index circuit works as follows. An 8 bit counter is used to count the number of frames that are processed. When a new top min score is found, the content of this counter is loaded into the top min index register. Each time the DTW begins a node processing, the maximum path length register is cleared to zeros (HEX). Then each new path length from the DTW is compared to the MAXLEN register. If this value is greater than the register content, the MAXLEN register is updated with the new value.

It is indicated that the above-described conditions have been generally described and no specific registers have been shown. This is due to the fact that such operating techniques are known and this is not part of the invention of this application. It is the format, as described in FIG. 3, which is the main aspect of the invention enabling the rapid processing of analog speech signals which have been converted according to prior art techniques to digital signals.

It is the orientation of both the Euclidian distance processor 20 and the dynamic programming processor 24 in conjunction with the format of the CPU which enables rapid system operation. The main aspect of the DTW configuration shown is to enable increased throughput by enabling the DTW module to process more coefficients using a conventional microprocessor as the CPU. In this manner, based on the methods described above and the structure utilized to access the memory chips, one can process more coefficients in a given amount of time then prior art systems. It also allows three different modes of operations, as will be described.

Figure 5:
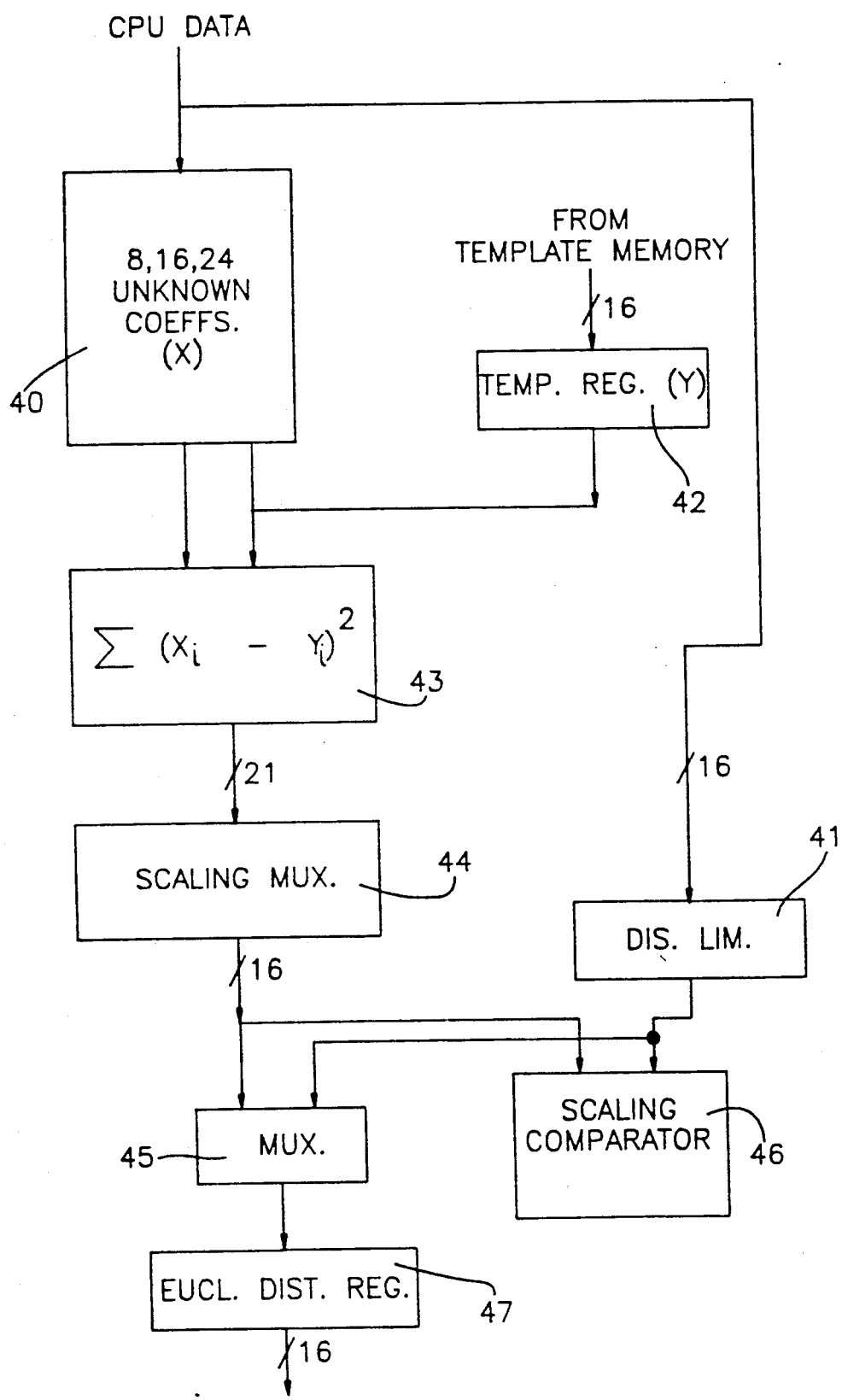
FIG. 5 is a block diagram showing a Euclidian distance processor apparatus employed in this invention.

Referring to FIG. 5 there is shown a block diagram of the Euclidian distance processor 20 depicted in FIG. 2. The Euclidian distance processor implements the following mathematic equation for calculating the Euclidian distance.

$$\text{Euclidian Distance} = \frac{1}{n} \times \sum_{i=1}^{m} (x_i - y_i)^2,$$

where:
n = distance scaling factor
m = number of frames in a node
x,y = template, unknown coefficients As seen in FIG. 5, the data which is transferred from the CPU via the CPU data line shown in FIG. 1, which is a 16 bit line, is applied to a plurality of registers contained in module 40. As indicated above, this particular system can process 8, 16 or 24 unknown coefficients as determined by or selected by the CPU. Essentially, the CPU informs the control register which processing mode is desired. Module 40 contains 8 registers for 8 coefficient processing, 16 registers for 16 coefficient processing and so on. The module 40 contains 48 registers which, for example, can be implemented in memory.

The CPU also furnishes the 16 bit distance limiting value to the distant limiting register 41 The template register 42 receives stored templates from the template memory. Both the unknown coefficients, designated as X, and the template register value, designated as Y are processed in the processor 43 to provide the functions shown. The number of times that the calculation is done is a function of the number of filter coefficients being processed.

For example, for 8 filter coefficients, the $(X-Y)^2$ function which will be provided 8 times. If it were 16 it would be provided 16 times. The value obtained is the absolute value as X may be greater than Y. The output of the processor 43 is applied to a scaling multiplexer 44. The scaling multiplexer 44 operates to limit the number of bits which are applied to a multiplexer 45 and a scaling comparator 46. The output of the multiplexer 45 is applied to Euclidian distance register 47. The incoming 16 bit word from the template memory, as applied to the template register 42, is divided into two 8-bit coefficients which undergo Euclidian distance calculations and are then summed to get a temporary value in the processor module 43. When all of the 8-bit coefficients are processed the maximum value in the accumulator, which is in module 43, is a 21 bit Euclidian distance. It is then shifted right n bits with zeroes left filled for scaling and a new value is compared against the 16 bit distance limiter register 41 as loaded by the CPU.

Finally, a multiplexer, which is 45, selects the smaller value to be stored into the 16 bit distance register 47. This is done by means of the scaling comparator 46 which receives the output from the scaling multiplexer 44 and the distance limiter module 41. The scaling comparator assures that the smaller value be stored in the Euclidian distance register 47.

There are four hard wired options for scaling, 0, 4, 6 and 8, which are analogous to divide by 1, 16, 64 and 256. The value in the distance register 47 is then passed to the dynamic programming processor (DPP). Depending on the configuration as to whether 8, 16 or 24 coefficients are processed, the signal output, when stored in the register 47, then clears the accumulator and module 43 before a new distance value is again stored, after all coefficients have been processed.

Figure 6:
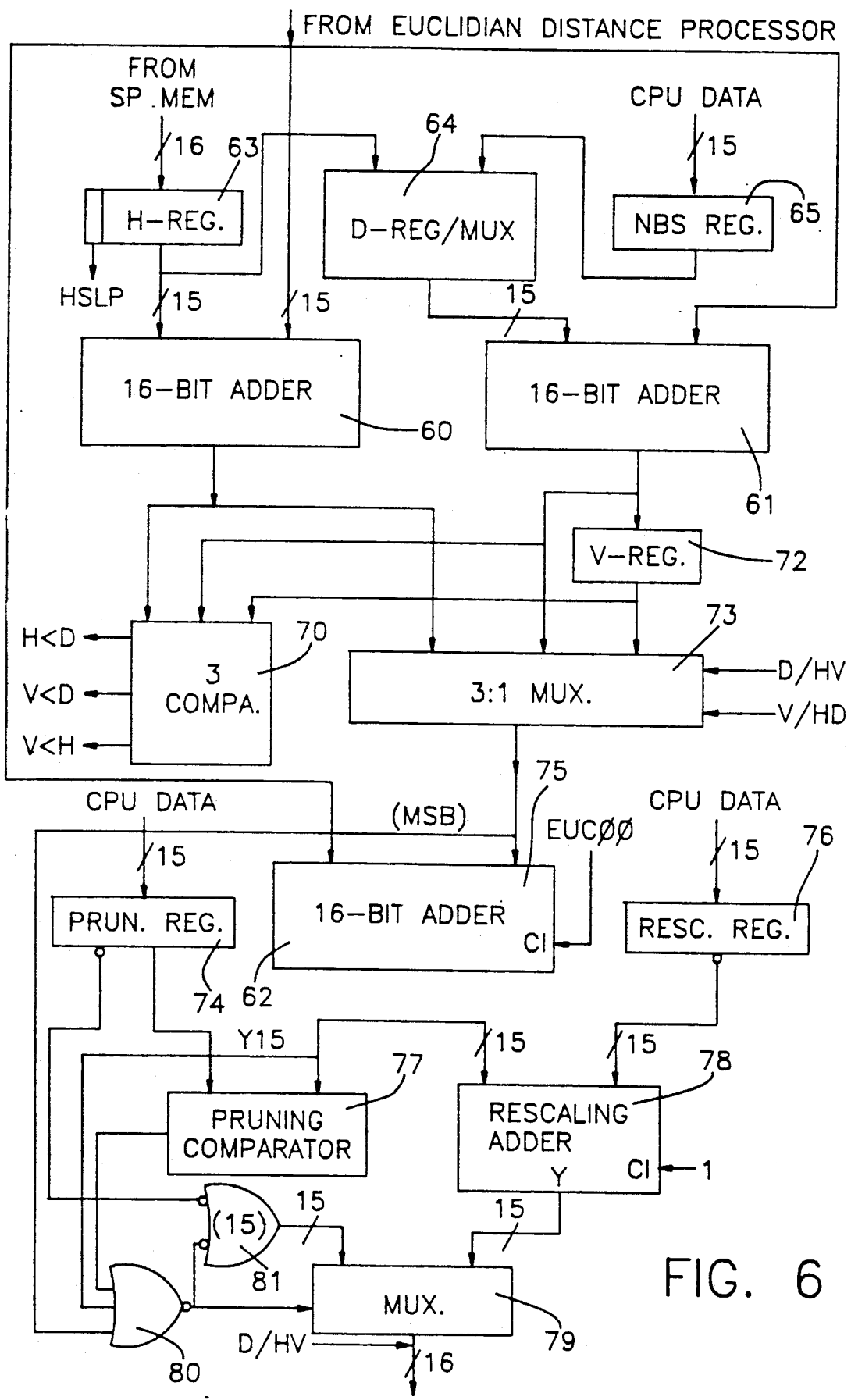
FIG. 6 is a block diagram showing a dynamic programming processor for computing distance.

Referring to FIG. 6, there is shown a block diagram of the dynamic programming processor 24 of FIG. 2. As indicated, the output from the Euclidian distance register 47 of FIG. 5 is applied to the dynamic programming processor. Specifically, the signal is applied to a 16 bit adder 60, a second 16 bit adder 61 and a third 16 bit adder 62. The scratch pad memory sends 16 bits to a horizontal register 63. The horizontal register 63 transfers the output to the D register and multiplexer 64 and also applies an output to the 16 bit adder 60. The D register and multiplexer operates to compute the diagonal distances which are applied to the 16 bit adder 61. The D multiplexer also receives CPU data which is applied to the NBS register 65 whose output is coupled to the D register 64. In this manner, the distance processor makes time warp decisions by comparing the horizontal (H), vertical (V) and diagonal (D) distances in choosing the least of these subject to slope considerations. The output of the 16 bit adder 61 is applied to the V register 62 and to a 3:1 multiplexer 63. The output of the 16-bit adder 60 is also applied to the multiplexer 63.

There is shown a comparator 70. Comparator 70 receives one input from the 16 bit adder 60, one input from the 16 bit adder 61 and one input from the V register 72. The comparator serves to determine which of the distance values, as H, V and D, are greater as indicated by the outputs on the left side of the module 70.

There is shown a pruning register 74 which receives CPU data and there is shown a rescaling register 76 which also receives the CPU data. The pruning register has one output coupled to the pruning comparator 77 which receives another output from the 16 bit adder 75. The output of the 16 bit adder 75 is also coupled to a rescaling adder 78 which receives another input from the rescaling register 76. The output of the pruning comparator 77 is applied to the input of a NOR gate 80. A NOR gate 80 receives another input from the 16 bit adder 75 and another input from the multiplexer 73 which is the most significant bit.

A further gate 81 has one input coupled to the output of the pruning register 74 and one input coupled to the output of gate 80. The output of gate 81 is coupled to one input of a two input multiplexer 79 receiving its other input from the rescaling adder 78. The output of multiplexer 79 is a 16 bit output indicative of distance.

Briefly, the operation of the circuit is as follows. The distance processor makes time warp decisions by comparing the horizontal, vertical and diagonal distances and choosing the least of the subject to slope constraints. Distance values are read from the scratch pad memory into the horizontal register 63. The content of this register 63 is sent to the D register 64 for the next comparison and finally to the V register 72. The final distance is then pruned by means of the pruning comparator 77 as influenced by the pruning register 74, rescaled by means of the rescaling register 76 and a rescaling adder 78 written back to the scratch pad memory via the multiplexer 79.

On the first distance calculation, the DTW is forced to make a diagonal move with the data coming from the node bottom score register as the diagonal value. This happens at the score register as the diagonal value. This happens at the beginning of a new node or after an end of template is encountered.

The value that gets chosen as new distance, $T_x$, is the minimum of $$H + d(DST_x - d_x), D + d(DST_{x-1} - d_x), \text{ and}$$

$$V + \frac{d_x}{2}\left(T_{x-1} + \frac{d_x - d_{x-1}}{2}\right).$$

where:
$T_x$ = the present target value (distance
$DST_x$ = the present distance value read from the SP
$d_x$ = the present Euclidian distance value
$\text{Anything}_{x-1}$ = the previous Anything value
$T_{x-1}$, the previous target value, is not saved within the DTW, but it is not needed because of the slope constraint. A vertical move cannot be taken twice in a row, so the V register only needs to contain $$DST_{x-2} + \frac{d_{x-1}}{2}.$$

Since all three values contain a d/2, this value is added to the result after the comparison.

The value from the adder 75 is then compared against the pruning register 74 in the pruning comparator 77. If it is greater, the rescaling is bypassed and a final distance is forced to a given hex value. If it is not greater, it is subtracted by the content of the rescale register by means of the rescale adder 78 and a new value is selected as the final distance. The rescale register will always be either less than or the same as the new score selected by the time warp decision. The pruning register 74 is employed to prune out an entire node by loading it with zero and then start the DTW processor in that particular node. A pruned out node will have all the distance values of a given specified hex number.

The most significant bit from the multiplexer 73 of the target value written to the scratch pad memory is the diagonal move bit which is D/HV. This bit will be a 1 if a diagonal move has been taken as when for example the D register is chosen. This is used later to enact the slope constraint that no two non-diagonal moves can be taken in a row. There is an option with a DTW forced to make only diagonal moves when it is used to perform the covering algorithm as employed in certain tasks. This is done by writing this command into the control register before starting a new node. This can be seen in FIG. 3 by referring to the box labeled D where it is diagonal move only.

Figure 7:
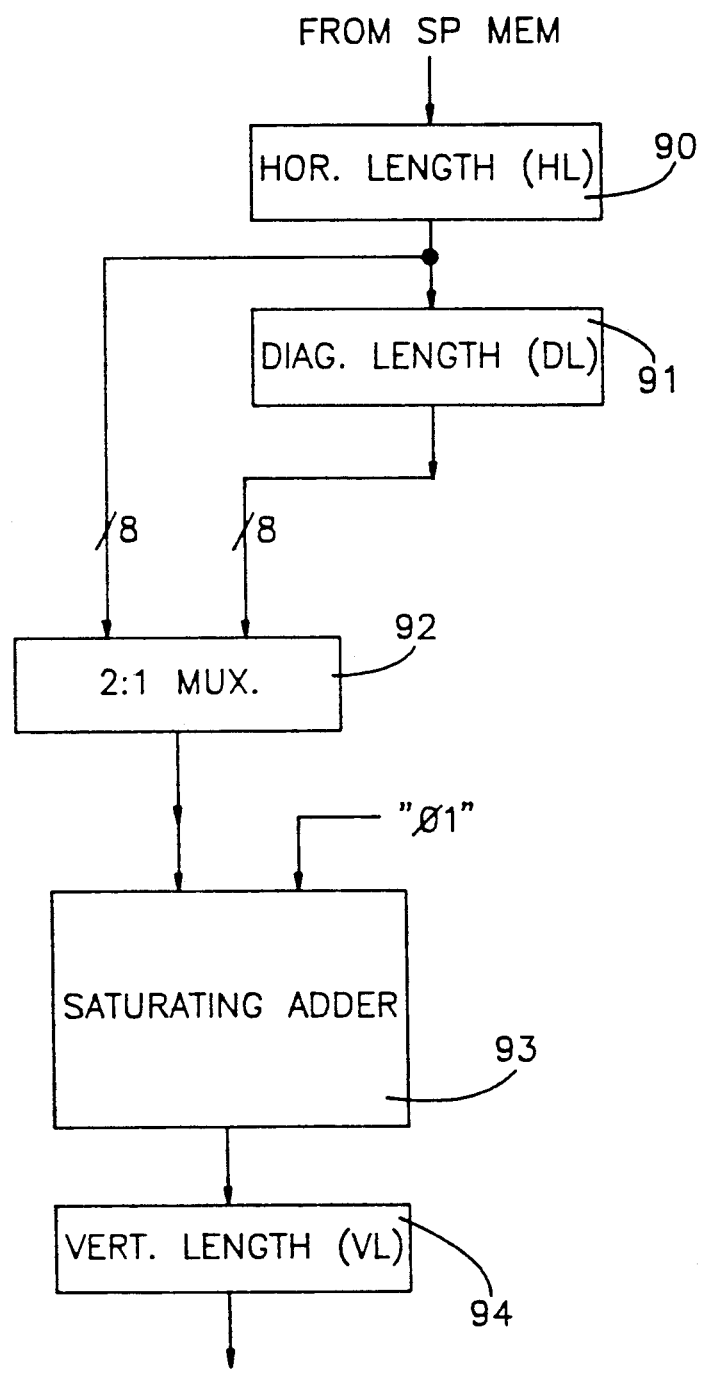
FIG. 7 is a block diagram showing a dynamic programming processor which will compute length for a speech recognition system.

Referring to FIG. 7 there is shown a block diagram of the length processor. The function of a length processor is that when a new node is started the DTW will always make a diagonal move with the length value from the diagonal length register, which is reset to zero for the first template. The DTW adds 1 to the length whenever a diagonal or horizontal move is taken. The multiplexer chooses between diagonal or horizontal. In the case of a vertical move, the VLX register, as will be explained, will not be clocked and it will contain the unchanged previous target length.

The saturating adder 92, will force to a given hex number any length value greater than a predetermined value. As seen, the dynamic programming processor, in regard to length, receives information from the scratch pad memory which is stored in the horizontal length register 90. The output of the horizontal length register 90 is applied to the diagonal length register 91 and also applied to a 2:1 multiplexer 92. The multiplexer 92 also receives the output from the diagonal length register 91. The output of the 2:1 multiplexer 92 is supplied to a saturating adder 93. The output of the saturated adder 93 is applied to the vertical length register 94 where the output of the vertical length register is the required distance.

As one can ascertain, the timing and control logic is simply implemented by using two ring shift counters which generate suitable phase and clock signals to provide controls for the DTW operations. These operation of course consist of the CPU read/write, which is to the template and scratch pad memory using the normal cycle with the DTW in idle or a template processing mode. The DTW read template/scratch pad memory and write to scratch memory using both fast page cycle and normal cycle with DTW in the template processing mode. The refresh cycle is in template and scratch pad memories using CAS before RAS and hidden refresh.

Figure 8:
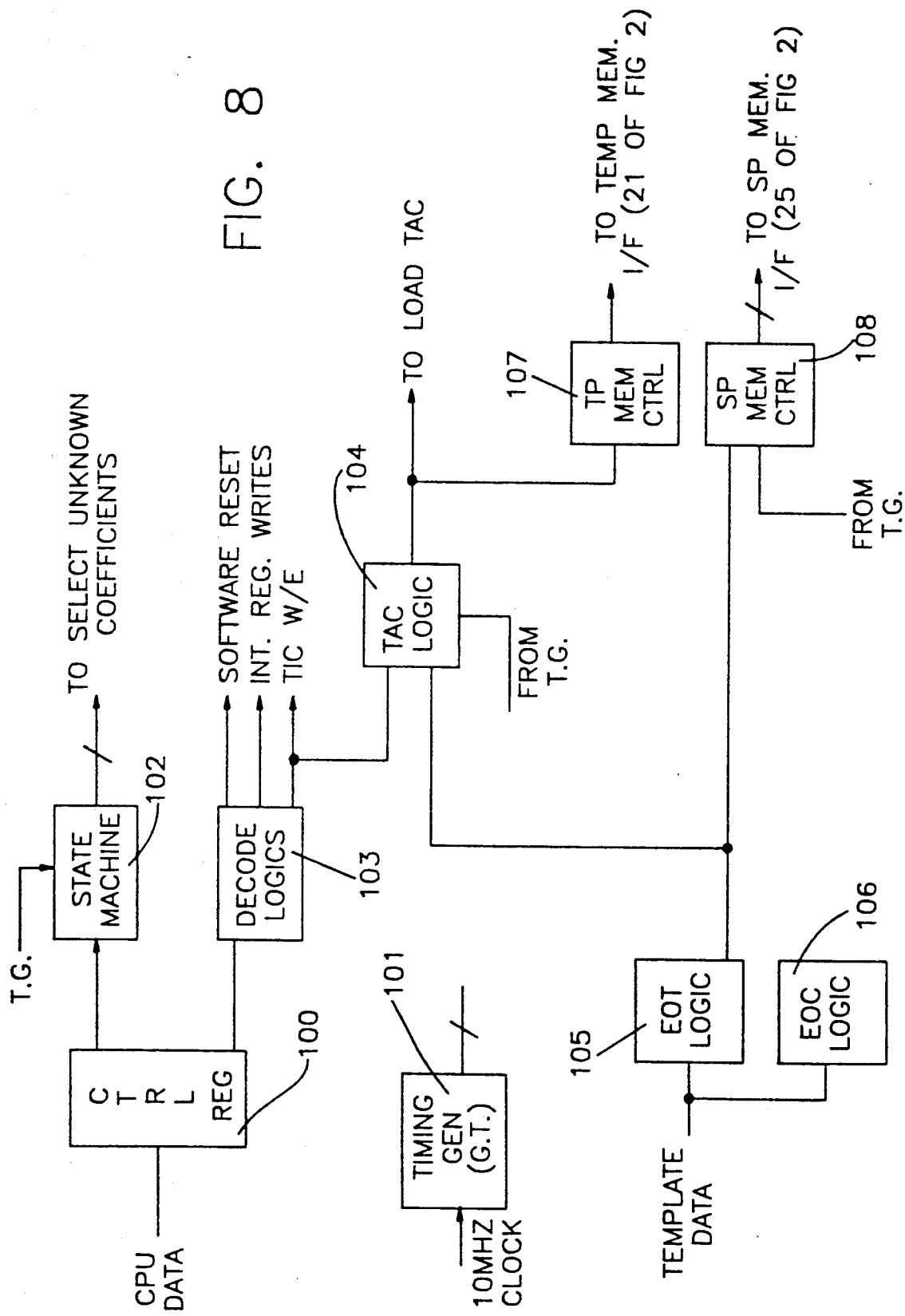
FIG. 8 is a block diagram of timing and control apparatus according to this invention.

Referring to FIG. 8, there is shown a block diagram of module 30 of FIG. 2 which has been referred to as the Timing and Controls. As one can ascertain, the module 30 is coupled to the Distance Processor 20, the Dynamic Programming Processor 24 and to the template memory I/F 21, and the scratch pad memory I/F 25 via these modules. The module provides timing and control based on information received from the control register 100. The format of the control register 100 is shown in FIG. 2, and essentially the control register may be mapped and located in scratch pad memory 25 as indicated. It is understood that the control register could be implemented in many ways including hardware versions.

The CPU interface I/F 32 receives the CPU data on the 16-bit bidirectional bus as shown in FIG. 2. The CPU data is transferred to the control register which as indicated above may be part of the scratch pad memory. Control register 100 as shown in FIG. 8 is a write only register which allows the CPU to configure the DTW to different operation modes. There is a timing generator 101 (TG) which provides timing control. The timing generator 101 operates to convert the 10 MHZ clock to suitable timing signals which provide timing controls to all modules. Two of the control register bits which are shown in FIG. 3 and designated as NN are used in a state machine 102. The state machine generates two controls which operate to select the appropriate unknown coefficient queue or queues. These outputs of the state machine 102 are directed to the multiplexer 45 of FIG. 10 which is included in module 40 of FIG. 5. The state machine thus controls the multiplexer to output the desired coefficients. This is the selection which is afforded by module 40 of FIG. 5 and is located in the Euclidian distance processor. The three bits (RRR) in the control register are decoded into different register read/write enables. One of these enables is for the TIC which when loaded with a starting node address will trigger the recognition mode. As one can ascertain, the TIC is the template index counter which may be mapped into the scratch pad memory. The template index counter operates to trigger the recognition mode. The TAC which is the template address counter is then immediately loaded using the TIC content with the address of template coefficients. The TAC content is always checked for an end of column (EOC) before the fetching of template coefficients. The end of column check is performed by module 106 which receives the template data to determine an end of a template column. This is sent to the scratch pad memory control 108 which has its output directed to the scratch pad memory interface or module 25 of FIG. 2. The coefficient data is also checked for an end of template (EOT) by means of EOT logic 105. This check results in an incrementing of the TIC. The output of the EOT logic 105 is directed to the scratch pad memory control 108 and then to the scratch pad memory I/F which is 25 of FIG. 2. The output of the end of template logic 105 is directed to the TAC logic 104 which also receives the TIC write enable signal from the decode logic 103. The decode logic 103 is a decode module which operates to decode the possible states of the control register 100 to determine the action to be taken by the system (DTW), such as software reset, providing write commands for the internal registers and to provide write and enable signals for the TIC. The TAC logic 104 provides the load command for the TAC (template address counter). The output of the TAC logic is also applied to the template memory control module 107 having an output coupled to the template memory I/F interface 21 of FIG. 2. Both of the template and scratch pad memories have reserved refresh cycles using CAS before RAS techniques. The hidden refresh mechanism would be used when the DTW must load the TAC during the refresh cycle.

Figure 9:
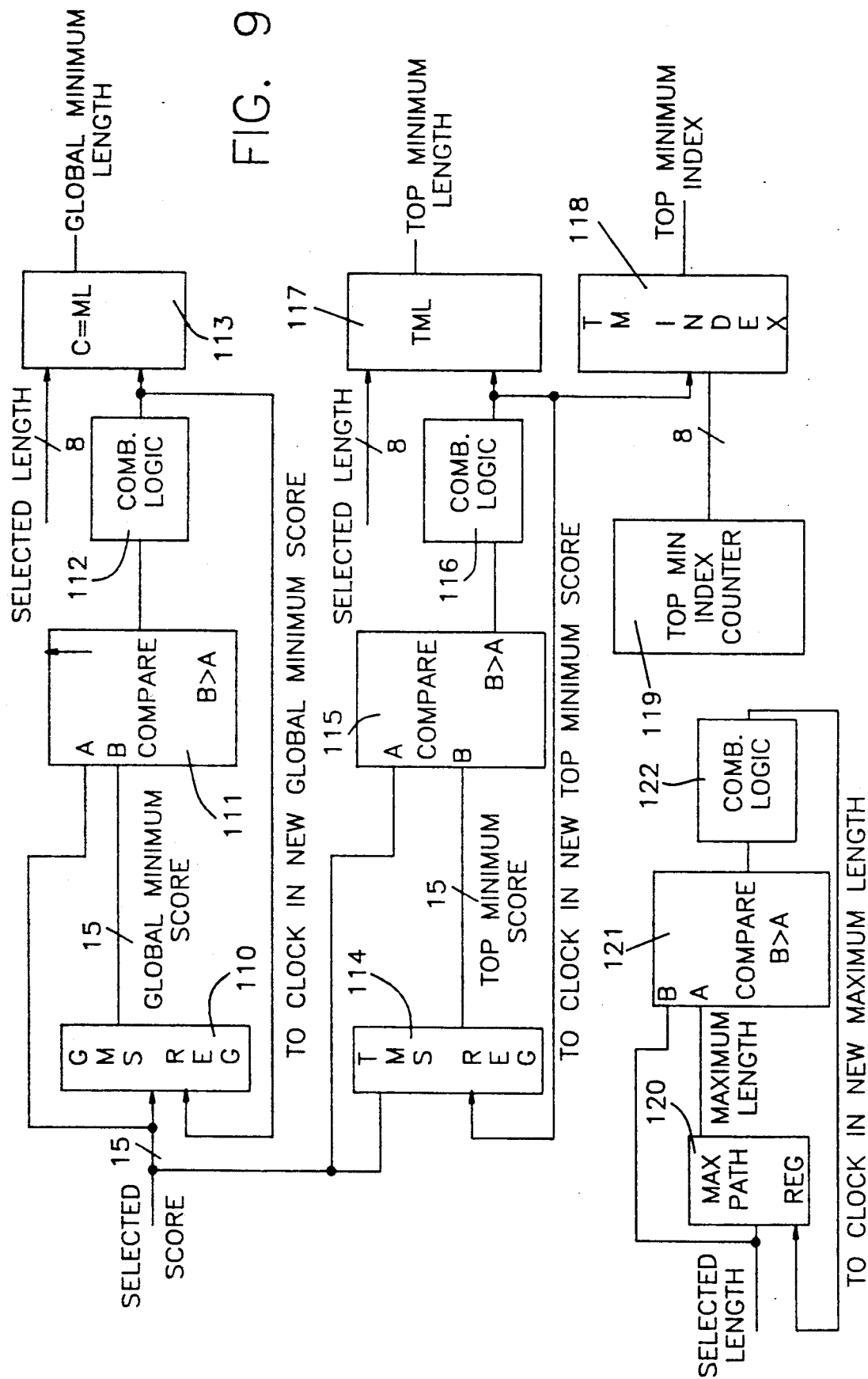
FIG. 9 is a a block diagram of a minimum scores and length apparatus according to this invention.

Referring to FIG. 9, there is shown the minimum score and length module 31 of FIG. 2 in greater detail. As seen in FIG. 9, a selected score is entered into the global minimum score register 110. This occurs as when the CPU writes into the TIC and the DTW begins its processing. Therefore, the global minimum score register is set to an initial start value. Until an end of column is reached, each score computed by the DTW is compared to the value in the global minimum score register. This is done by means of the comparator 111. If this score is less than the value of the global min score register, the register is updated by means of the combinatorial logic module 12 to a new value. Thus, when the CPU reads the register 110, the value that it receives is the smallest distance value in the present node. The selective length is stored in the GML register 113 whose output provides global minimum length.

In order to provide a top minimum score, a top minimum score register TMS 114 is initialized to a value at the beginning of each new node. When an end of template is encountered, the last score is again compared by means of comparator 115 to the value in the TMS register 114. If this value is less than the register content, the TMS register 114 will be updated with a new value by means of the logic 116. The length or the top minimum length is stored in register 116. The top minimum index counter 119 is an 8-bit counter and is used to count the number of frames that are processed. When a new top minimum score is found, the contents of this counter is loaded into the register 118. Each time the DTW begins a node processing the maximum path length register 120 is cleared to zeroes then each new path length from the DTW is compared to the contents of this register. If this value is greater than the register content, the register is updated with a new value. The comparison is made by module 121 or comparator 121 and the updating is achieved by the logic contained on module 122.

Thus, as one can see from FIG. 9, the format of the registers as well as the comparators is implemented in accordance with the above-described conditions to enable the DTW to compute the appropriate scores in order to determine whether the uttered phrase matches selected key words.

Figure 10:
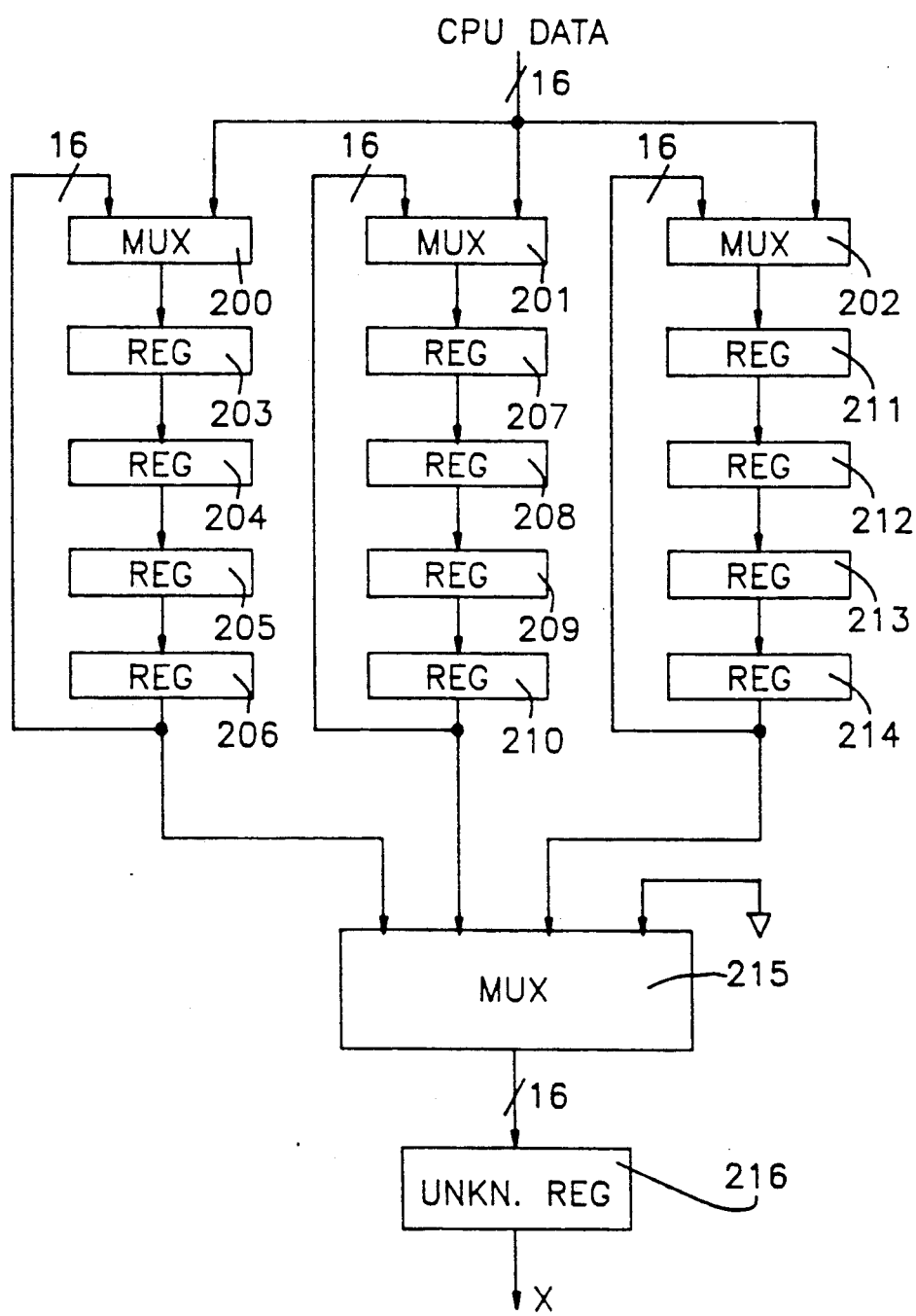
FIG. 10 is a block diagram of a coefficients register array.

Referring to FIG. 10, there is shown a block diagram of the module 40 as depicted in FIG. 5. The module 40 receives 8, 16 or 24 unknown coefficients and operates on these coefficients depending upon the processing mode implemented by the DTW. As one can ascertain, there are twelve 16-bit registers as for example 203 to 214 which are separated into three groups with each group containing four registers and capable of storing eight 8-bit coefficients. The registers in each group are connected together in a circular queue except that the first item in the queue will take input from either the last item or from the CPU utilizing a multiplexer. Hence, multiplexer 200 is associated with registers 203 to 206. Multiplexer 201 is associated with registers 207-210 and multiplexer 202 is associated with registers 211-214. The CPU data can enter in any of the multiplexers as shown in the FIG. An output multiplexer 215 operates to again accept the data from any of the registers and to store it into the unknown register 216 whose output is the same as the X coefficient shown in FIG. 5. It is noted that during the Euclidian distance calculation process, a group or groups of unknown coefficient registers, again dependent upon the operation mode, will be selected through the multiplexer and individually stored in the unknown register 116 to be processed against the template coefficient data as shown for example in FIG. 5. The state machine 102 is coupled to the output multiplexer 45 and selects the proper coefficients.

Figure 11:
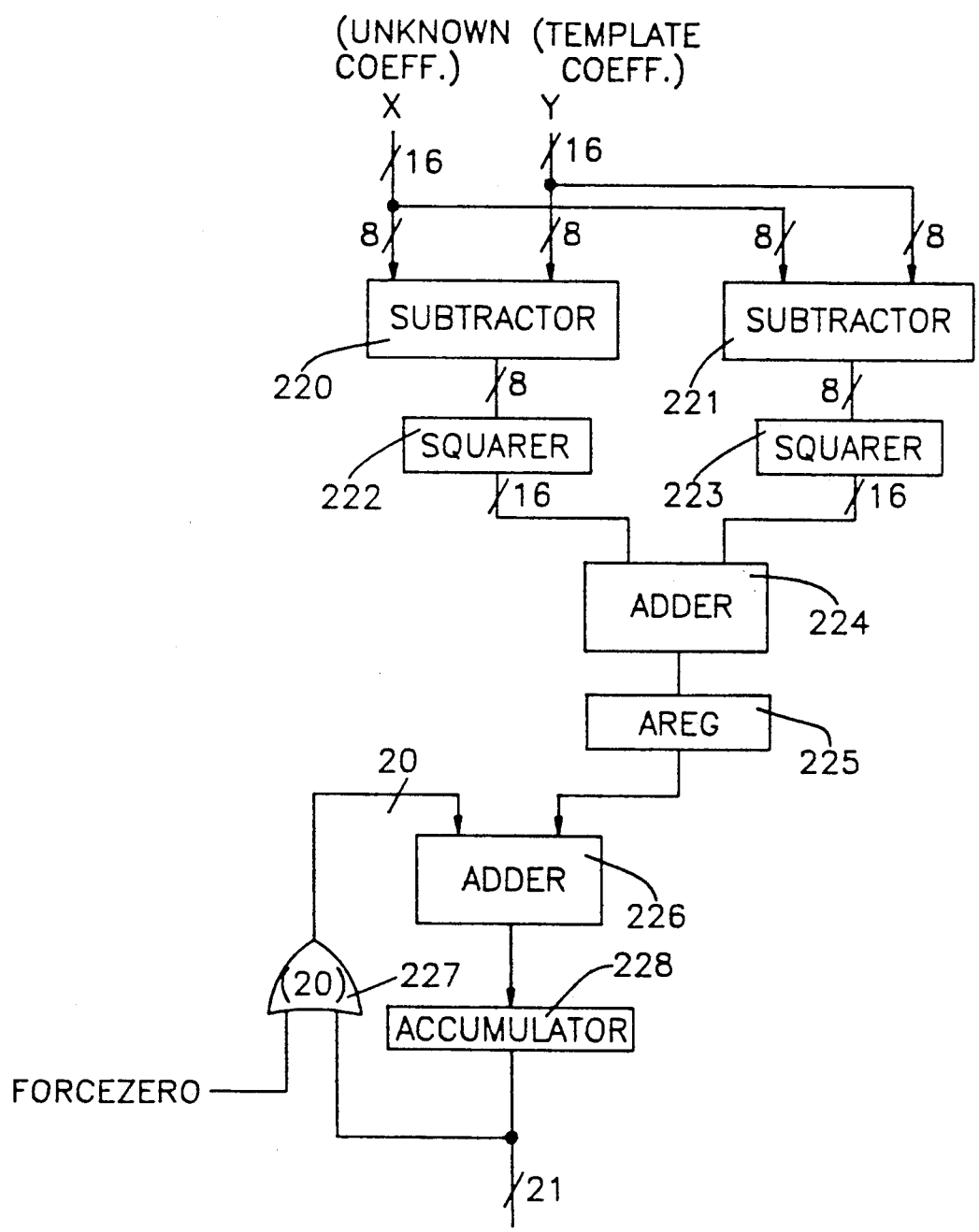
FIG. 11 is a block diagram of a coefficient processing module.

Referring to FIG. 11, there is shown a more detailed block diagram of the module 43 of FIG. 5 which provides the sum of the unknown coefficients and the template coefficients after subtracting and squaring. As seen in FIG. 11, the unknown coefficients X and the template coefficients Y are respectively applied to two subtractors 220 and 221. The unknown coefficient data path from the register 40 of FIG. 2 and the template coefficient data path from the template data register are separated into two pairs of 8-bit quantities. Each pair is concurrently subtracted and squared. As one can ascertain, there is a squarer 222 associated with the subtractor 220 and a squarer 223 associated with subtractor 221. The squarers have outputs which are directed to the inputs of an adder 224. The adder adds the squared outputs together and stores the sum in a temporary register 225. Finally, the result from the temporary register 225 is placed into an accumulator via an adder 226. Input to the adder is derived from a gate 227 which has a signal applied from the CPU designated as FORCE ZERO. The FORCE ZERO signal assures that the accumulator 228 is cleared out after required iterations have been done accordingly to 8, 16 or 24 coefficient modes.

Figure 12:
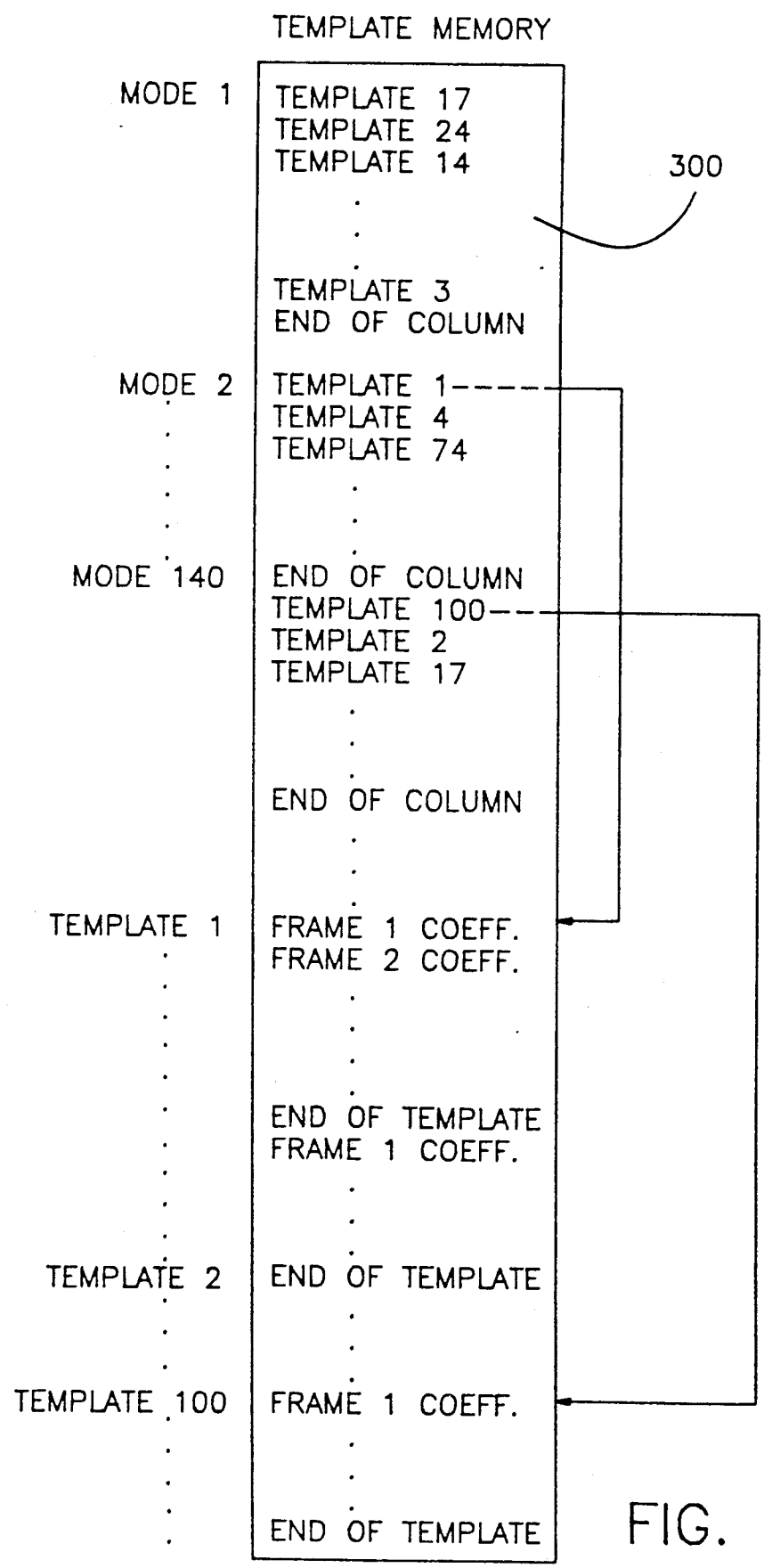
FIG. 12 is a block diagram of a template memory arrangement for storing template data.

Referring to FIG. 12, there is shown a typical layout of the template memory. Based on the system structure, the template memory requires the storage of templates in a completely different manner from that done in the prior art. Typically, many repetitions of words appear in an application's syntax structure. In the prior art all such repetitions were stored in template memory. As one will understand in the present system, only one copy of each template is stored.

In this system the memory is accessed via nodes which contain template listings. To the left of the template memory 300 there are designated node 1, node 2, node 140 and so on. The nodes are shown sequentially as from node 1 to node 140. More nodes or less nodes may be employed. Each node contains a number of templates. Hence, in FIG. 12 under node 1 there is template 17, template 24, template 14, . . . template 3 and end of column. Each node such as node 2 and node 140 contains a number of templates shown as template numbers. In actuality the address of the beginning of each of the templates would appear in each node. The templates are stored after the nodes in the template memory. There are two coefficients per word which are stored in template memory, for example template 17 may actually be stored as 17, template 24 stored as 24 and so on. An end of template flag or a certain bit pattern appears at the end of a template which may be composed of many frames to delineate the template boundary. An end of column node flag, which again is a certain bit pattern, appears at the end of each node template to delineate the node boundaries.

Thus, as one can understand and as seen in FIG. 12, there is shown an end of column designation stored in the memory after each particular node. Also seen on the left and on the bottom of FIG. 12 is a listing of templates as template 1, template 2, template 100 and so on. Each template is stored in memory with the corresponding frame coefficients as the frame 1 coefficient, frame 2 coefficient, and so on also indicating the end of the template. In this manner, when a template matching is to begin, one accesses a node as for example node 1. Node 1 specifies the various templates as 17, 24, 14, and after the node is entered, one now accesses each of the templates as specified by the particular node by going to the template portion of the memory. For example node 2 includes template 1 and there is shown an arrow drawn from template 1 in node 2 to template 1 as stored in memory. Thus when accessing a node one obtains all templates which are indicative of a given Syntax. This syntax structure is stored in memory at a node which tells the system which templates to access as for node 2, template 1, template 4, template 74, . . . and an end of column.

Figure 13:
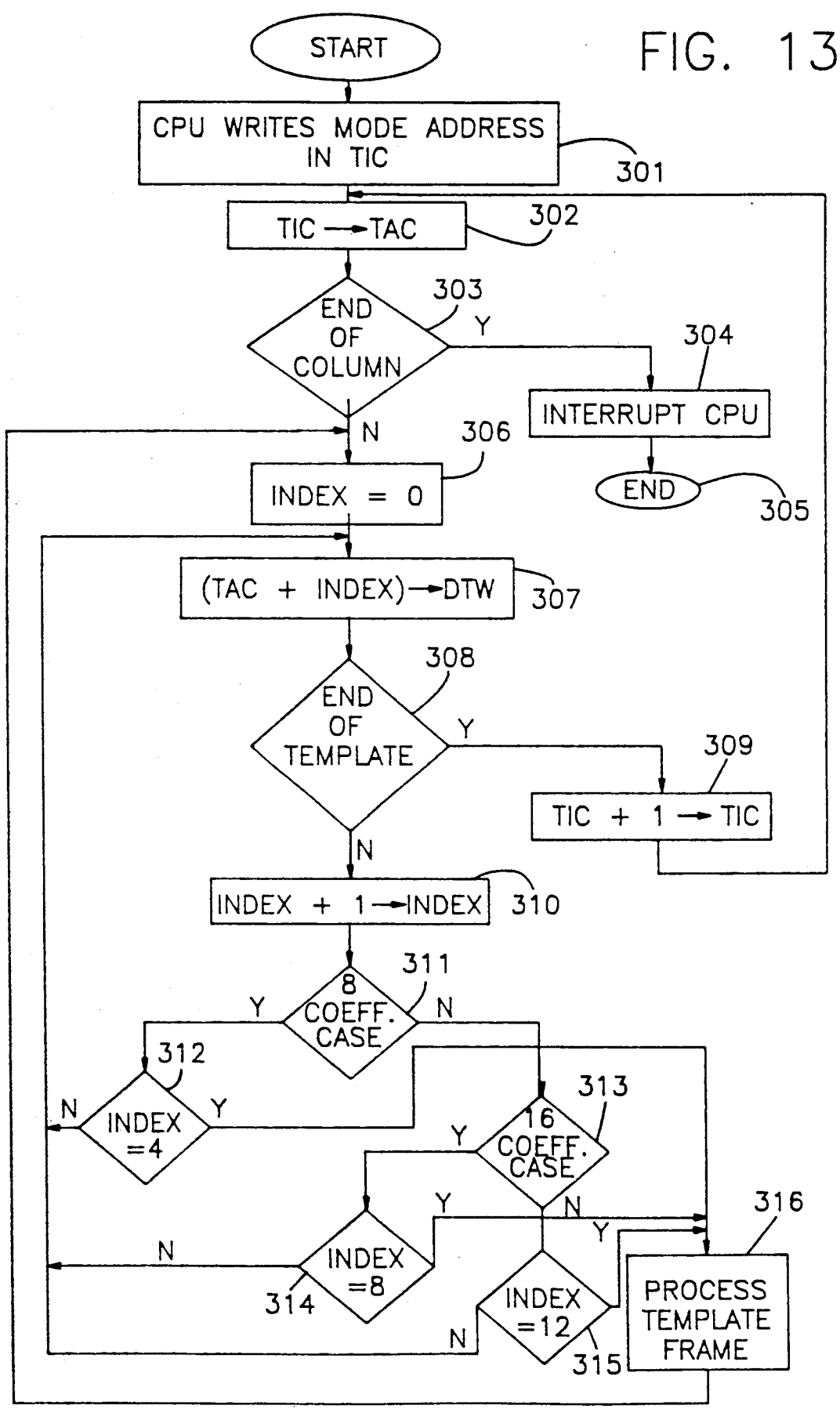
FIG. 13 is a flow chart useful in explaining coefficient retrieval.

Referring to FIG. 13, there is shown a flow chart of a program depicting the coefficient fetching scheme. The coefficient fetching procedure is implemented by means of the start which is designated at the top of the flow chart. The start causes the CPU to write the node address into the TIC. The CPU essentially activates the node to be processed by loading the TIC with the template memory address which corresponds to the beginning of the node to be processed. As one can understand by referring to FIG. 12, the nodes include the list of templates contained in each node. The template's address is loaded into the TAC as evidenced by step 302. The contents of the address which the TIC is pointing to are loaded into the TAC. An index is used to track the number of coefficients read. The length that the index is allowed to grow to is a function of whether 8, 16 or 24 coefficients are being processed. As one can understand, the system as evidenced by module 303 looks for an end of column which is stored in memory. If it detects an end of column, it then interrupts the CPU as shown in step 304 and provides an end to the program as shown in step 305. If it does not read an end of column then it begins to index as shown in step 306 and 307. When the system reaches an end of template as shown by module 308 the TIC+1 is loaded into the TIC as evidenced in module 309 and one returns to the next node address. If it does not reach the end of template then the index procedure occurs continuously as shown by module 310 and again depending on whether it is an 8, 16 or 24 coefficient case that is being processed. The TAC points to the template in template memory. The contents of the address which the TAC plus the index is pointing to (TAC +Index) in module 307 are read into the DTW and data is tested for an end of template and also for and end of column. If the data is neither, it is coefficient data and is thus processed. An end of template flag resets the index to zero and increments TIC to fetch the next template location. At this point the data is tested for an end of column bit pattern. An end of column flag results in an interrupt to the CPU indicating that a node has been processed. This procedure is shown and indicated on the flow chart by modules 311 to 316.

Thus, as one can understand, the system has the ability to process a programmable number of coefficients as 8, 16 or 24 with each coefficient having an 8-bit resolution. In prior art systems the coefficients had 4-bit resolution. As indicated and shown in the flow chart, one can now provide this system to enable one to process the different number of filter coefficients utilizing 8-bit resolution.

The above-described system operates to generate the time warping functions necessary to implement word spotting or other continuous speech recognition systems. The DTW chip is designed to operate as a co-processor. Due to the abovenoted architecture, the DTW as described improves the throughput available in word recognition or speech recognition or speaker verification as it processes more coefficients in a given time. It is capable of providing three different modes of operation where it can process 8 filter coefficients, 16 or 24 and allows more rapid processing with a simpler hardware configurations.

We claim:

1. A speech recognition system for recognizing unknown uttered speech, or recognizing individual key words, or verifying the identity of a speaker from unknown speech, by comparing the unknown speech with stored templates representing known reference speech words or phrases and providing a best match to determine a word or phrase uttered or the identity of the speaker, the system including an analog to digital converter for converting the unknown speech into digital formats and a digital signal processor for converting said digital formats into template frames of the unknown speech each represented by a plurality of coefficients, wherein said template frames of the unknown speech are processed by dynamic time warping to derive from said coefficients Euclidean distances which are processed by template comparison to provide a best match between the unknown speech and a stored reference template indicative of a spoken word, in combination therewith,
said digital signal processor having means for providing template frames having coefficients of any selected one of at least two different groups, with a first group of a given number of coefficients and a second group of at least twice the number of coefficients,
dynamic time warping (DTW) means operative to process unknown speech template frames of either the first or second group of coefficients as selected, including:
Euclidean distance processor means for computing a given bit Euclidean distance between the unknown speech template frames and the reference template frames independent of the number of coefficients in said selected group and
dynamic programming processor means responsive to outputs from said Euclidean distance processor means for providing a dynamic time warping distance measurement as compared to said reference template to determine a best match to the unknown speech independent of the number of coefficients processed.

2. The system according to claim 1 where said digital signal processor means for providing coefficients provides coefficients in a first group of 8 coefficients and a second group of 16 coefficients.

3. The system according to claim 1 where said digital signal processor means for providing coefficients provides 8, 16 or 24 coefficients for first, second and third groups.

4. The system according to claim 1 wherein said DTW means includes a plurality of registers equal to the maximum number of coefficients to be processed and
means for selecting the number of registers according to the number of coefficients.

5. The system according to claim 1 wherein said DTW means includes means for calculating said Euclidian distance a given number of times equal to the number of coefficients.

6. The system according to claim 1 wherein said DTW means processes said coefficients in a 20 millisecond frame time.

7. The system according to claim 6 wherein 33,333 frames are processed for 8 coefficients.

8. The system according to claim 6 wherein 16,666 frames are processed for 16 coefficients.

9. The system according to claim 6 wherein 11,111 frames are processed for 24 coefficients.

10. The system according to claim 1 wherein said DTW means includes a template memory means for storing templates and a scratch pad memory means for implementing system calculations.

11. The system according to claim 1, wherein said coefficients are bandpass filter coefficients.

12. The system according to claim 1, wherein said coefficients are linear predictive coding (LPC) coefficients.

13. The speech recognition system according to claim 12 wherein each individual template includes an end of template pattern for specifying the end of a template.

14. In a speech recognition system for recognizing unknown uttered speech by comparing the unknown speech with stored templates representing known reference speech words or phrases, wherein the reference speech words or phrases consist of respective combinations of individual templates, an improved apparatus for storing the templates representing the known reference speech words or phrases without repetitions of individual templates in memory, comprising:
a memory having a first plurality of storage locations for storing in each location a node format comprising a plurality of addresses for individual templates forming a template combination for a reference speech word or phrase; and a second plurality of storage locations for storing in each location a separate individual template, wherein the individual templates stored separately in said second plurality of storage locations are respectively addressed by the addresses of any of the node formats stored in said first plurality of storage locations, whereby the individual templates are stored in said memory without repetition and respectively addressed according to the addresses of the template combination stored in said node format.

15. The speech recognition system according to claim 14 wherein said node format further includes an end of column pattern for specifying the end of said template combination.

16. A method for storing templates in a memory for use in a speech recognition system, wherein a combination of individual templates constitutes a reference speech word or phrase to be recognized by the system, comprising the steps of:

storing in first separate memory locations a node formed by a combination of template addresses, with each node indicative of a combination of individual templates each having a separate address;

storing in second memory locations separate individual templates each having a respective separate address;

first accessing a stored node to provide said template addresses of a template combination and then accessing each of said templates of the template combination according to said stored addresses for each node accessed.

17. The method according to claim 16 further including storing an end of column flag with each node to delineate the node boundary.

18. The method according to claim 16 further including storing an end of template pattern with each template to delineate the template boundary.

* * * * *